United States Patent [19]

Tomka et al.

[11] Patent Number: 4,591,475
[45] Date of Patent: May 27, 1986

[54] METHOD FOR MOLDING CAPSULES

[75] Inventors: Ivan Tomka, Bourguillon; Fritz Wittwer, Lupisingen, both of Switzerland

[73] Assignee: Warner-Lambert Company, Morris Plains, N.J.

[21] Appl. No.: 490,057

[22] Filed: Apr. 29, 1983

Related U.S. Application Data

[62] Division of Ser. No. 362,430, Mar. 26, 1982, abandoned.

[51] Int. Cl.⁴ .................. B29C 45/28; B29C 45/54; B29C 45/73; B29C 45/74
[52] U.S. Cl. .................. 264/328.14; 264/40.1; 264/40.4; 264/328.17; 425/550; 425/551; 425/564; 425/568; 425/572; 424/37
[58] Field of Search .................. 426/515, 576; 264/328.17, 328.14, 40.1, 40.4; 425/550, 551, 564, 568, 572; 424/37

[56] References Cited

U.S. PATENT DOCUMENTS

| | | | |
|---|---|---|---|
| 3,653,934 | 4/1972 | Rolle | 106/125 |
| 4,076,846 | 2/1978 | Nakatsuka | 426/514 X |
| 4,224,348 | 9/1980 | Hayashi | 426/576 X |

OTHER PUBLICATIONS

*Whittington's Dictionary of Plastics* by Lloyd Whittington, Stamford, Conn., Technomic, ©1968, Preface; pp. 179-181.

*Primary Examiner*—Philip Anderson
*Attorney, Agent, or Firm*—Pennie & Edmonds

[57] ABSTRACT

A method of producing capsules of a moldable hydrophilic polymer composition, preferably gelatin, using a combination of an injection molding device with a microprocessor to precisely control the conditions of time, temperature, pressure and water content of the hydrophilic polymer composition, in a cyclic molding process.

16 Claims, 11 Drawing Figures

METHOD FOR MOLDING CAPSULES

This is a division of application Ser. No. 362,430 filed Mar. 26, 1982 and now abandoned.

BACKGROUND OF THE INVENTION

A. Field of the Invention

The present invention relates to the combination of an injection molding device with a microprocessor, and a method to produce capsules of a moldable hydrophilic polymer composition, preferably gelatin. The present invention utilizes gelatin, preferably made from various types of gelatin including acid or alkaline processed ossein, acid processed pigskin, or alkaline processed cattle hide. Said types of various gelatin have a molecular mass range of 10,000 to 2,000,000 Dalton or a molecular mass range of 10,000 to 2,000,000 and 10,000,000 to 20,000,000 Dalton. The method for determination of the molecular mass distribution of the various types of gelatin used in the present invention is performed as described in the following references:

I. Tomka, Chimia. 30, 534–540 (1976)
I. Tomka, et al, Phot. Sci. 23, 97 (1975)

Gelatin having a molecular mass range between 10,000 and 2,000,000 Dalton, was found to give less deformation of capsule parts after ejection from a capsule mold, When in the following description the term "gelatin" is used, other hydrophilic polymers whose properties were acceptable as capsule materials are also included. Hydrophilic polymers are polymers with molecular masses from approximately $10^3$ to $10^7$ Dalton carrying molecular groups in their backbone and/or in their side chains and capable of forming and/or participating in hydrogen bridges. Such hydrophilic polymers exhibit in their water adsorption isotherm (in the temperature range between approximately 0° to 200° C.) an inflection point close to the water activity point at 0.5. Hydrophilic polymers are distinguished from the group called hydrocolloids by their molecular dispersity. For the maintenance of the molecular dispersity of said hydrophilic polymers a fraction of water-according to the working range of the present invention-of 5 to 25% by weight of said hydrophilic polymers must be included provided that the temperature of said hydrophilic polymers is in the working range between 50° C. and 190° C. of the present invention.

There are other hydrocolloids, not hydrophilic polymers in the sense of this definition, which contain more or less spherical or fibrous particles whereby those particles are composed of several macromolecules of a hydrophilic polymer within the molecular mass range of $10^3$–$10^7$ Dalton giving rise to particle sizes between 0.01–10 microns which is the typical range of colloidal particles. It is a primary object of the present invention to utilize hydrophilic polymers in the production of capsules.

B. Reference to Copending Patent Applications

Concurrently with this application, please also refer to patent application U.S. Ser. No. 362,177 filed Mar. 26, 1982 and to patent application U.S. Ser. No. 362,430 filed Mar. 26, 1982, both of which are copending with this application.

C. Description of the Prior Art

Capsule-making machines have been developed to utilize dip-molding technology. Such technology involves the dipping of capsule-shaped pins into a gelatin solution, removing the pins from the solution, drying of the gelatin upon the pins, stripping off the gelatin capsule parts from the pins, adjusting for length, cutting, joining and ejecting the capsules. Prior art capsule-making machines have utilized the combination of mechanical and pneumatic elements to perform these functions at speeds up to about 1,200 size 0 capsules per minute. While the above described apparatus are in general suitable for the intended purposes, it is desirable to produce capsules at considerably higher speed, over 15,000 size 0 capsules per minute, while at the same time precisely controlling the properties of the gelatin in order to produce the capsules hygienically and with minimum dimensional deviations so that the capsules can be filled on high speed equipment.

Shirai et al. in U.S. Pat. No. 4,216,240 describes an injection moldng process to produce an oriented fibrous protein product. The fibrous product as obtained by this process differs fundamentally from the transparent glasslike material of the capsules obtained from the present invention. Furthermore to obtain a flowable mass for the molding process, the protein mixtures used by Shirai et al. have to be denatured and thus lose their capacity to undergo dissolution.

Nakatsuka et al. in U.S. Pat. No. 4,076,846 uses binary mixtures of starch with salts of protein materials to obtain an edible shaped article by an injection molding process. With the present invention shaped articles from protein materials, preferably gelatin and other hydrophilic polymers can be produced without the addition of starch.

Heusdens et al. in U.S. Pat. No. 3,911,159 discloses the formation of filamentous protein structures to obtain edible products of improved tenderness. With the present invention shaped articles are produced without a filamentous protein structure.

The use of an injection molding device for producing capsules of gelatin and other moldable hydrophilic polymers with similar properties is new and has not been suggested in the technical literature. A prerequisite for any material to be moldable by an injection process is its ability to pass a glass transition point at a temperature compatible with the thermal stability of the material and the technical possibilities of an injection molding device.

The present invention provides an improved injection molding method adapted to be automatically controlled by microprocessing techniques and utilizing molding compositions in the form of hydrophilic polymers, such as gelatin, possessing a dissolution point within a temperature range usable for an injection molding process, and which permit the water content to be controlled within a predetermined range to avoid the need for additional steps of either drying or humidifying of the molded product formed by the injection molding device.

SUMMARY OF THE INVENTION

The present invention covers an improved automatic injection molding device having, a hopper unit for receiving, storing, maintaining and feeding gelatin, and having a discharge outlet; an injection unit including, a cylindrical means having an inlet end connected to the outlet for said hopper unit to receive gelatin therefrom, and a transport and ram member rotatably and slidably mounted in said cylindrical means for moving and to permit plasticizing of the gelatin therein, a molding unit connected to the end of the cylindrical means remote from the inlet end including, capsule part mole means, and means for ejecting molded capsule parts. A normally closed valve means is connected between the cylindrical means and the molding unit whereby on movement of the valve means to open position a predetermined quantity of plasticized gelatin will be delivered to said capsule part mold means in the molding. Also, a microprocessor having parameters stored in a memory therein to define a plurality of time settings is used to provide a desired work cycle for said injection unit and said molding unit and the optimum pressure, temperature and water content for the gelatin in the hopper unit. Sensing means sense and signal the actual operating times of the injection unit and the molding unit and the temperatures, pressure and water content of the gelatin in the hopper unit. Means are connected to the sensory means and the microprocessor for detecting the deviation between the actual conditions sensed by said sensory means and the stored parameters in the microprocessor. This includes means for signaling said deviation and actuating means connected to said deviation signaling means for adjusting the operation of the hopper, the injection unit and the molding unit to maintain optimum operation of the automatic capsule molding device.

Additionally, the present invention also covers methods for molding capsule parts under controlled conditions of time, temperature, pressure and water content of gelatin comprising the steps of:

a. melting the gelatin by heating,
b. dissolving in water the molten gelatin,
c. plasticizing (plasticating) the molten gelatin by the heating along with mechanical working thereof,
d. molding the plasticized (plasticating) gelatin by cooling in a closed capsule parts mold, and
e. ejecting capsule parts of cooled gelatin from the capsule parts mold.

It is therefore a primary object of the present invention to provide a new and improved injection molding-microprocessor apparatus and a method for molding gelatin, which alleviates one or more of the above described disadvantages of the prior art arrangements.

It is another object of the present invention to provide a new and improved injection molding-microprocessor apparatus and a method of molding gelatin capsules by continuous monitoring and control of the pertinent gelatin parameters in order to prevent degradation of the gelatin and deformation of the capsule parts.

It is a further object of the present invention to provide an injection molding-microprocessor apparatus and a method of molding gelatin capsules at high speed and with precision in order to use the gelatin capsule with high speed filling equipment.

BRIEF DESCRIPTION OF THE DRAWINGS

The invention both as to its organization and method of operation together with further objects and advantages thereof will best be understood by reference to the following specifications and taken in conjunction with the accompanying drawings.

DETAILED DESCRIPTION OF THE PREFERRED EMBODIMENT

Figure 1:
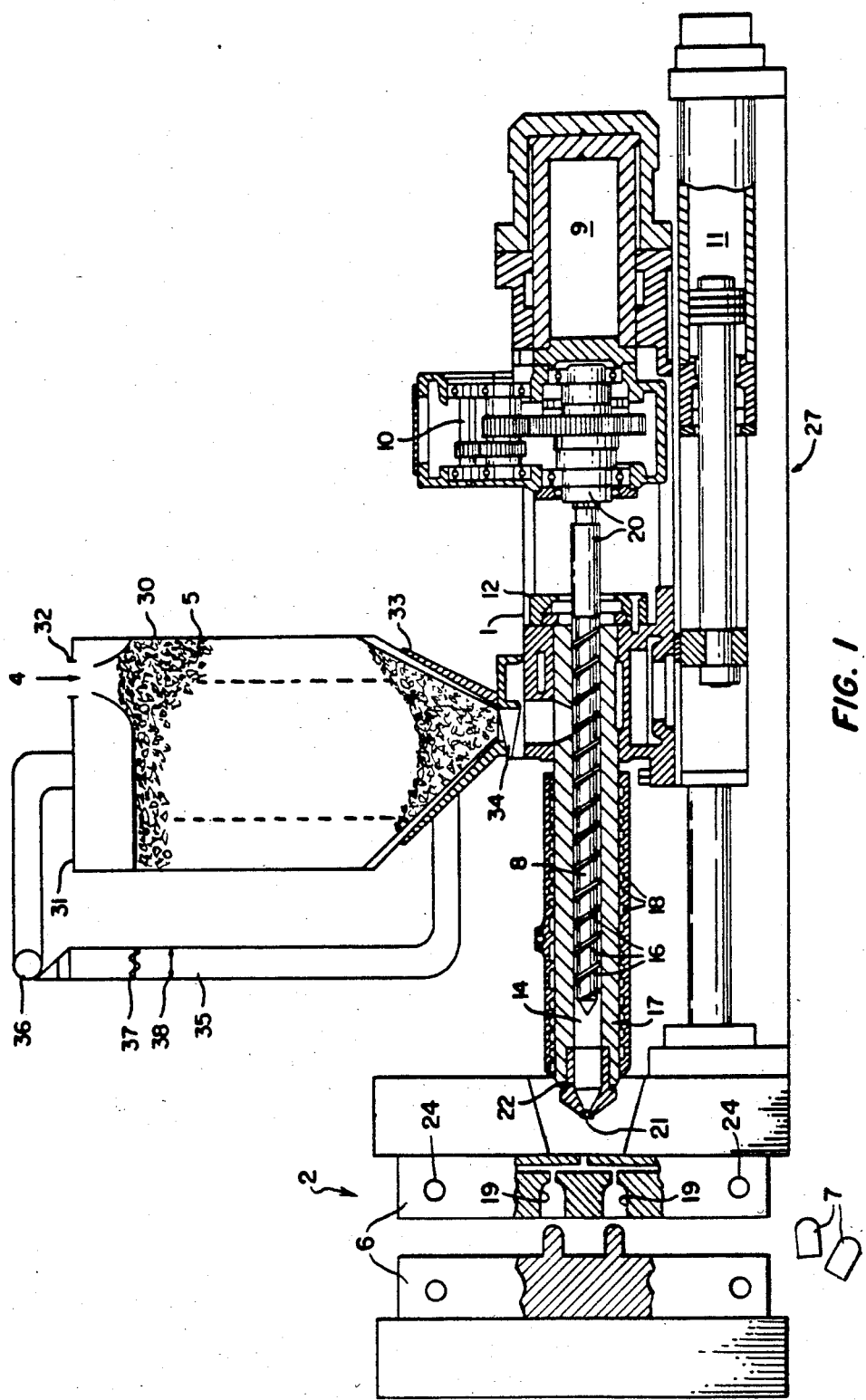
FIG. 1 is a layout of the reciprocating screw injection molding device for making gelatin capsule parts.

Referring now to FIG. 1 the injection molding device 27 generally consists of three units: a hopper unit 5, an injection unit 1 and a molding unit 2.

The function of the hopper unit 5 is receiving, storing, maintaining and feeding gelatin 4 at a constant temperature and at a constant water content. The hopper unit 5 comprises a vertical cylinder 30 having a closed top 31 with an inlet 32 therein to receive gelatin 4. At the bottom of the vertical cylinder 30 is a closed conical funnel 33 and a discharge outlet 34 to feed gelatin 4 into the injection unit 1. There is an air duct 35 communicating between the closed top 31 and the conical funnel 33 wherein air is circulated by a blower 36, the air temperature is controlled by a thyristor 37 and the air relative humidity is controlled by a steam injector 38.

The function of the injection unit 1 is melting, dissolving in water and plasticizing or plasticating in the extruder barrel 17 the particulate gelatin 4 fed from the hopper unit 5 into the extruder inlet 54 and injecting the plasticized gelatin 14 into the molding unit 2.

The function of the molding unit 2 is automatically holding, opening and closing the mold 6 having capsule-shaped cavities 19 therein, and ejecting the capsule parts 7 therefrom.

Within the injection unit 1 the screw 8 both rotates and undergoes axial reciprocal motion. When the screw 8 rotates, it performs the functions of melting, dissolving in water and plasticizing the gelatin 4. When the screw 8 moves axially, it performs the function of injecting by transporting and ramming the plasticized gelatin 14 into the mold 6. The screw 8 is rotated by a variable speed hydraulic motor and drive 10, and its axial motion is reciprocated by a duplex hydraulic cylinder 9.

Compression of the plasticized gelatin 14 in front of the rotating screw 8 forces back the screw assembly 20 containing the screw 8, the drive 10 and the cylinder 9. When the screw assembly 20 reaches a pre-setback position a limit switch 12 is contacted. When a defined time has elapsed during which the gelatin 4 becomes fully plasticized gelatin 14 the hydraulic cylinder 11 brings the screw assembly 20 forward and uses the screw 8 as a ram for the plasticized gelatin 14 to be injected through a valve body assembly 50 (FIG. 4) including a one-way valve 15, a needle valve 23, a nozzle 22 and an outlet port 21 into the molding unit 2. The one-way valve 15 prevents the plasticized gelatin 14 from going back over the helical flutes 16 of the screw 8. The extruder barrel 17 has steam heating coils 18 to heat the gelatin 4 while it is being compressed by the screw 8 into plasticized gelatin 14. It is desirable for the plasticized gelatin 14 to be heated at the lowest possible temperature and to be transported with the lowest possible speed of the screw 8. The speed of the screw 8 and the heating of the plasticized gelatin 14 within the extruder barrel 17 by the steam heating coils 18 control the quality and the output rate of the plasticized gelatin 14 injected into the molding unit 2. The molding unit 2 holds the mold 6 having capsule-shaped cavities 19 therein into which the plasticized gelatin 14 is injected and maintained under pressure. Refrigerant cooling conduits 24 encircle the mold 6 so that when the plasticized gelatin 14 in the mold 6 has cooled and sufficiently solidified, the molding unit 2 opens, the mold 6 separates and the capsule parts 7 are ejected.

Figure 2:
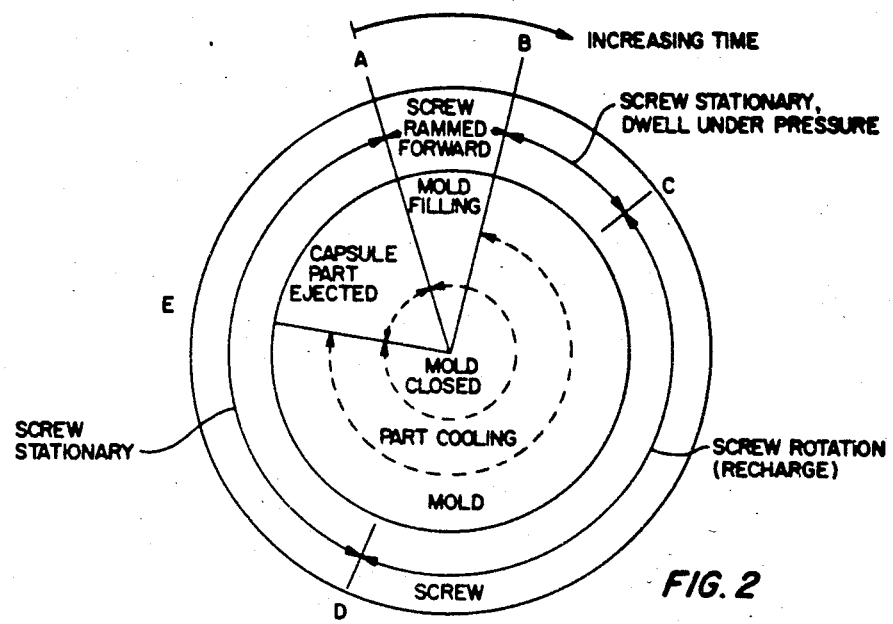
FIG. 2 is a schematic of the injection molding work cycle for making gelatin capsule parts.

Referring now to FIG. 1 and also to FIG. 2 which depicts the injection molding work cycle for gelatin 4 (containing approximately 17% water, by weight) plotted against time. In general the work cycle of gelatin 4 is as follows in the injection molding device 27 of the present invention:

a. particulate gelatin 4 is fed into the hopper unit 5 where it is received, stored and maintained under controlled conditions of temperature ranging from ambient to 100° C., pressure ranging from $1-5\times10^5$ Newtons per square meter ($N\times m^{-2}$) and water content ranging from 5 to 25% by weight of gelatin, b. the gelatin is melted and mechanically worked under controlled condition of temperature ranging from 50° to 190° C., water content ranging from 5 to 25% by weight of gelatin and pressure ranging from 600 to $3000\times10^5\,N\times m^{-2}$ to form a melt, c. the molten gelatin melt is dissolved in water under controlled conditions of temperature ranging from 50° to 190° C., pressures ranging from 600 to $3000\times10^5\,N\times m^{-2}$ and water content ranging from 5 to 25% by weight of gelatin, d. the heating and mechanical working of the gelatin melt plasticizes (plasticates) the mixture and this is done under the controlled conditions of temperature ranging from 50° to 190° C., pressure ranging from 600 to $3000\times10^5\,N\times m^{-2}$ and water content ranging from 5 to 25% by weight of gelatin, e. the plasticized (plasticated) gelatin melt is injected into a capsule-shaped part mold 6 under controlled conditions of temperature below 50° C., injection pressure ranging from 600 to $3000\times10^5\,N\times m^{-2}$ and a clamping force of the mold 6 below approximately 600,000 Newton, and f. The capsule-shaped parts 7 are ejected from the molded gelatin within the capsule mold 6.

Beginning at Point A of FIG. 2 the screw 8 moves forward and fills the mold 6 with plasticized gelatin 14 until Point B and maintains the injected plasticized gelatin 14 under high pressure, during what is called the hold time from Point B until Point C of FIG. 2. At Point A the one-way valve 15 near the end of the screw 8 prevents the plasticized gelatin 14 from flowing back from the nozzle 22 onto the screw 8. During hold time, additional plasticized gelatin 14 is injected, offsetting contraction due to cooling and soldification of the plasticized gelatin 14. Later, the outlet port 21, which is a narrow entrance to the molding unit 2 closes, thus isolating the molding unit 2 from the injection unit 1. The plasticized gelatin 14 within the mold 6 is still at high pressure. As the plasticized gelatin 14 cools and solidifies, pressure drops to a level that is high enough to ensure the absence of sinkmarks, but not so high that it becomes difficult to remove the capsule parts 7 from the capsule-shaped cavities 19 within the mold 6. After the outlet port 21 closes at Point C, screw 8 rotation commences. The plasticized gelatin 14 is accommodated in the increased cylindrical space in front of the screw 8 created by its backward axial motion until Point D. The flow rate of the plasticized gelatin 14 is controlled by the speed of the screw 8 and the pressure is controlled by the back pressure (i.e., the hydraulic pressure exerted on the screw assembly 20) which in turn determines the pressure of the plasticized gelatin 14 at the nozzle 22 in front of the screw 8. After plasticized gelatin 14 generation for the next shot into the mold 6, the screw 8 rotation ceases at Point D. The gelatin 4 on the stationary screw 8 continues to melt, Points D to E, by heat conduction from the steam heating coils 18 on the extruder barrel 17. This period is called soak time. Meanwhile, the solidified capsule parts 7 are ejected from the mold 6 Thereafter the mold 6 closes to accept the next shot of plasticized gelatin 14. All of these operations are automated and controlled by a microprocessor as hereinafter described.

Figure 3:
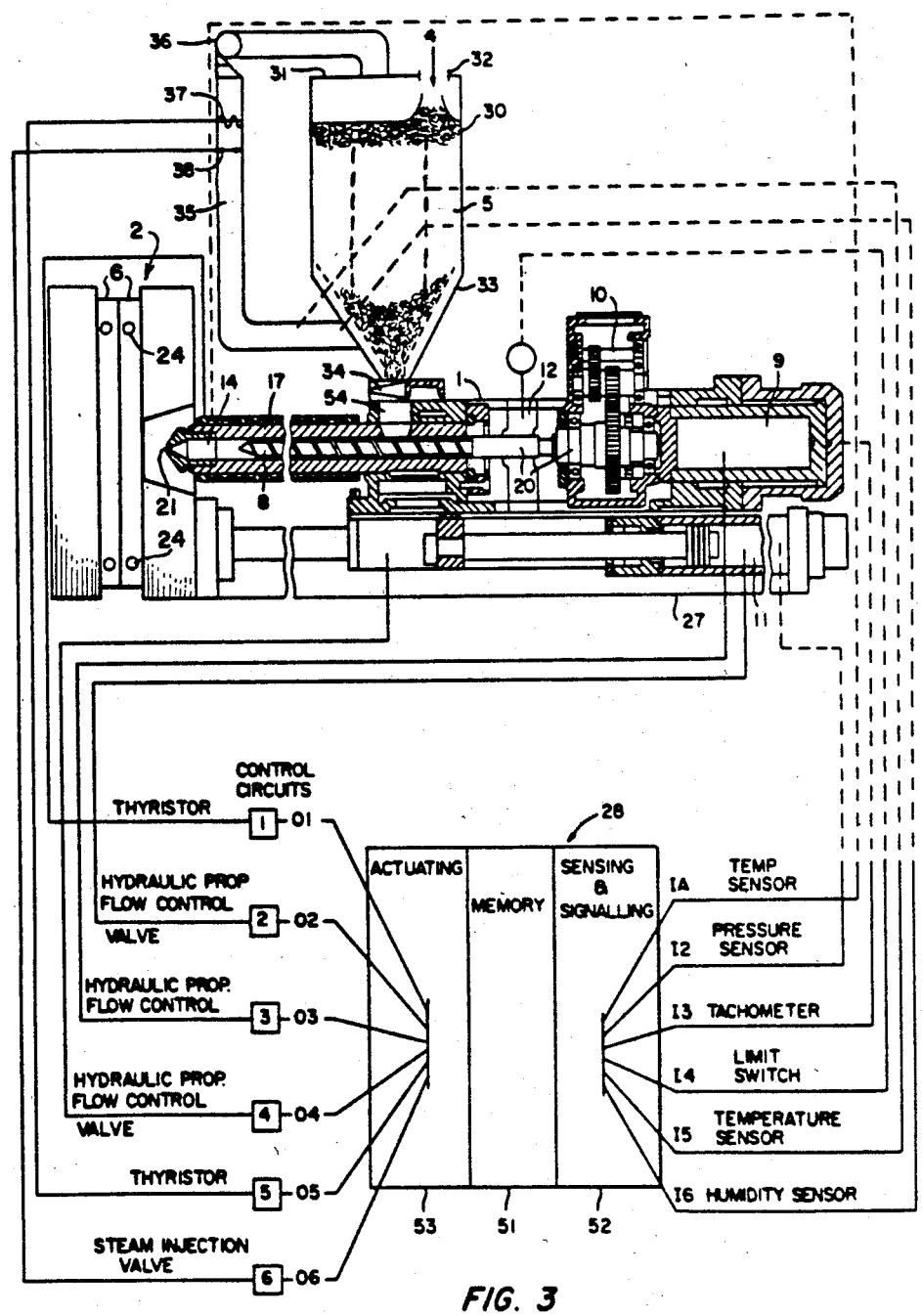
FIGS. 3 is a schematic of the combined injection device-microprocessor apparatus for gelatin capsule parts.

Referring now to FIG. 2 and and also to FIG. 3. The injection molding work cycle of FIG. 2 is accomplished on the injection molding device 27 of FIG. 3 by hydraulic and electrical components and the corresponding circuits controlled by the microprocessor 28 of FIG. 3.

Through the use of solid-state circuitry and speed temperature, limit and pressure switches for the electric and hydraulic systems, the microprocessor 28 of the present invention utilized command signals in its memory for the parameters of time, temperature and pressure conditions of Table 1 below for the injection molding work cycle of FIG. 2 to be accomplished by the injection molding device 27 of FIG. 3 in producing gelatin capsule parts 7.

TABLE 1

Ranges of Time, Temperature and Pressure for the Injection Molding Work Cycle of FIG. 2:

| | POINTS | | | | |
|---|---|---|---|---|---|
| | A | B | C | D | E |
| Time (seconds) | $10^{-2}-1$ | $10^{-2}-1$ | $10^{-2}-1$ | $10^{-2}-1$ | $10^{-2}-1$ |
| Temperature (°Celsius) | ambient-100 | 50-190 | 50-190 | 50-190 | 50-190 |
| Pressure ($10^5 \times N \times m^{-2}$) | 1-5 | 600-3000 | 600-3000 | 0-3000 | 600-3000 |

TABLE 1-continued

Ranges of Time, Temperature and Pressure for the
Injection Molding Work Cycle of FIG. 2:

| | POINTS | | | | |
|---|---|---|---|---|---|
| | A | B | C | D | E |

(Newtons per square meter)

Referring now to FIG. 3 illustrating the combined injection molding device 27 and microprocessor 28 utilizing the method of present invention.

The combined injection molding device 27 and microprocessor 28 comprises six control circuits of which five are closed-loop, fully analog, and one is on-off. Starting at molding cycle Point A in FIG. 2, the injection molding work cycle operates as follows:

When sufficient plasticized gelatin 14 has accumulated in front of the screw 8 (microprocessor time controlled) and also when the screw assembly 20 carrying the screw 8, drive 10 and hydraulic motor 9 has been pushed far enough backwards against a constant back-pressure as controlled by control circuit 3, limit switch 12 will be actuated by sensing circuit $I_4$. Upon these two conditions control circuit 4 is actuated causing the hydraulic fluid to flow into the forward portion of the hydraulic cylinder 9. This rams the screw assembly 20 forward, thus injecting the plasticized gelatin 14 into the mold 6 as molding cycle Point B of FIG. 2 is reached, and, as controlled by the microprocessor 28, the screw 8 remains stationary in this forward position under high pressure for a certain period of time until Point C.

From molding cycle Point B of FIG. 2 onwards the plasticized gelatin 14 cools down in the mold 6 and the port 21 closes at molding cycle Point C of FIG. 2.

At molding cycle Point C of FIG. 2 the screw 8 starts to rotate again and the hydraulic pressure reduced from the forward portion of the hydraulic cylinder 9 to a pressure slightly less than the pressure set for the backward portion of the hydraulic cylinder 9.

The barrel 17 is kept under constant pressure towards the mold 6 by the pressure in the back position of the hydraulic cylinder 11. This is achieved by means of the control circuit 2 where a proportional hydraulic valve is controlled by a pressure circuit sensor $I_2$.

As the screw 8 rotates a recharge of gelatin 4 is made from the hopper 5. During a certain time period and at a defined rotating speed of the screw 8, controlled by control circuit 3, a precise amount of gelatin 4 is fed into the extruder barrel 17. Control circuit 3 is actuated by a speed sensor circuit $I_3$ measuring the rotating speed of the screw 8 and sensing back to a hydraulic proportional flow control valve $O_3$, controlled by control circuit 3, thus assuring a constant rotating speed of the hydraulic motor 10, irrespective of the changing torque resulting from introduction of the gelatin 4 recharge.

When the load time is completed, the screw 8 rotation is stopped and molding cycle Point D of FIG. 2 is reached. The soak time from molding cycle Points D to A of FIG. 2 allows for the gelatin 14 to plasticize completely under controlled temperature conditions as controlled by control circuit 1.

A temperature sensor circuit $I_1$ senses a thyristor heat regulator $O_1$ heating the extruder barrel 17 as directed by control circuit 1.

During the time interval from molding cycle Points B to E on FIG. 2, the mold 6 has cooled down sufficiently so that the finished capsule parts 7 can be ejected from the mold 6.

After ejection of the capsule parts 7, the work cycle returns to Point A of FIG. 2 where a certain volume of plasticized gelatin 14 has accumulated in front of the screw 8 (sensory circuit $I_4$ is actuated and time has elapsed) so that the work cycle of FIG. 2 can be repeated.

It is important to note the temperature and humidity control loops 5 and 6, for the maintenance of precise water content of the gelatin in the hopper 5, which is essential for proper operation at the desired speeds.

The microprocessor 28 includes a memory section 51 to store the desired operating parameters; a sensing and signalling section 52 to receive the sensing signals of actual operating conditions, to detect the deviation between the desired and actual operating conditions, and to send signals for adjustment through the actuating section 53 to the thyristors and valves.

Figure 4:
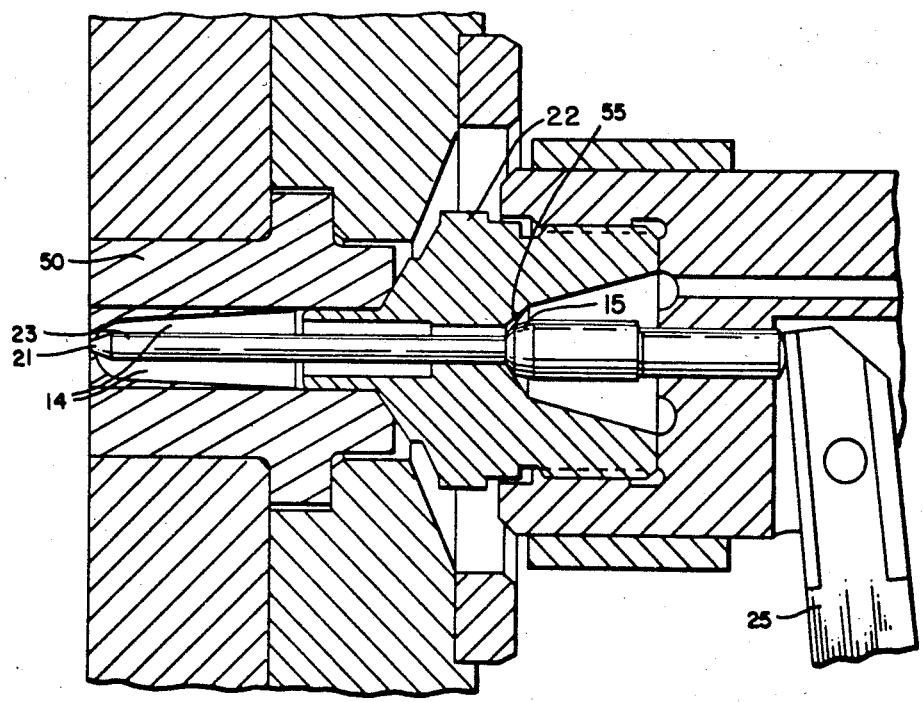
FIG. 4 is an expanded schematic of the exit end of the injection molding device.

Referring now to FIG. 4 there is shown the valve body assembly 50 including the outlet port 21, the nozzle 22, the needle valve 23, and the one-way valve 15 These elements operate as follows:

At Point A in FIG. 2 the needle valve 23 is retracted from the outlet port 21 and the one-way valve 15 is retracted from the body of the nozzle 22 so as to form an inlet opening 55 for plasticized gelatin 14 into the nozzle 22 which defines a charging chamber for plasticized gelatin 14. The plasticized gelatin 14 is injected through the nozzle 22 and into the mold 6 during the mold-filling time between Points A and B in FIG. 2. At Point C in FIG. 2 the needle valve 23 is pushed forward so as to close the outlet port 21 during which time, between Points C and E in FIG. 2, the mold 6 is closed and the capsule part 7 in the mold 6 is cooling. The needle valve 23 remains closed between Point E and A in FIG. 2 during which time the capsule part 7 is ejected from the mold 6. The total time period between Point B and A in FIG. 2 must be less than 5 seconds so that the plasticized gelatin 14 does not solidify in the nozzle 22. This is an important aspect of the present invention because:

(a) faster production times are made possible in order to achieve greater output;
(b) there is no loss of plasticized gelatin 14 in the production cycle due to solidification in the nozzle 22 and the mold 6; and
(c) there is a minimum risk of degradation of the plasticized gelatin because it remains in the production cycle for a short time and is only utilized once in each production cycle because the plasticized gelatin 14 is solidified only once in the capsule-shaped cavities 19 and not in the nozzle 22.

The one-way valve 15 and the needle valve 23 are actuated by a spring-tensioned lever 25 which normally closes both the outlet port 21 and the nozzle 22 until the lever 25 is cam-actuated pursuant to signals from the microprocessor 28.

The thermomechanical properties of gelatin, i.e. storage and loss shear modules at different temperatures, are strongly dependent on its water content. The capsule molding process of the present invention can be used for gelatin with a water content preferably within a range of 5 to 25%. The lower limit is defined by the maximum processing temperature of 190° C., which in turn cannot be exceeded in order to avoid degradation. The upper limit is determined by the stickiness of the finished capsules. The abbreviations in Table 2 below will be used hereinafter in this application.

TABLE 2

Abbreviations of Used Physical Parameters

| ABBRE-VIATION | UNIT | DESCRIPTION |
|---|---|---|
| $T_a, P_a$ | Degree C., $N \times m^{-2}$ | Ambient temperature and pressure. |
| $H(T,P)$ | KJoule $\times$ $Kg^{-1}$ | Enthalpy of the hydrophilic polymer-water system at a given pressure and temperature. |
| $\mathcal{X}(T,P)$ | $N^{-1} \times m^2$ | Compressibility of the hydrophilic polymer at a given temperature and pressure. Its numerical value is the relative volume change due to change of pressure by a unit amount. |
| $\alpha(T,P)$ | (Degree C.)$^{-1}$ | Volumetric thermal expansion coefficient of the hydrophilic polymer at a given temperature and pressure. Its numerical value is the relative volume change due to change of temperature by a unit amount. |
| $V(q,T,P)$ | Kg $\times$ sec$^{-1}$ | is the flow rate of the hydrophilic polymer at a given temperature and shear deformation rate and pressure. Its numerical value is the volume of a melt leaving the exit crosssectional area of an injection molding device in unit time due to the applied shear deformation rate. |
| $T_{G1};$ $T_{G2}(X)$ | Deg C. | The temperature range of the glass-transition of the hydrophilic polymer. |
| $T_{M1};$ $T_{M2}(X)$ | Deg C. | The temperature range of the melting of the partially crystalline hydrophilic polymer. |
| $T_E(t)$ | Deg C. | The temperature of the hydrophilic polymer in the nozzle area of the injection unit. |
| $T_M(t)$ | Deg C. | The temperature of the hydrophilic polymer in the mold. |
| $P_M$ | $N \times m^{-2}$ | The pressure of the hydrophilic polymer in the mold. |
| $P_E$ | $N \times m^{-2}$ | The pressure in the nozzle area of the hydrophilic polymer. |
| X | | The water content of the hydrophilic polymer, expressed as the weight fraction of the water - hydrophilic polymer system. |

For the control and regulation of the injection molding process (IMP) we need the knowledge of the
(1) heat consumption of the melting process:

$$H(T_E, P_E) - H(T_a, P_a)$$

(2) the heating rates of the hydrophilic polymers in the injection molding device. To calculate this we need the heat conduction number of the hydrophilic polymer and the heat transfer number of the hydrophilic polymer and the specific material of construction of the barrel which is in contact with the hydrophilic polymer. The heating rate and the heat consumption of the hydrophilic polymer give the minimum time interval necessary to make the hydrophilic polymer ready to inject and the necessary heating power of the injection molding device.

(3) the $T_E$ depends on X of the hydrophilic polymers. If the water content of the hydrophilic polymer in the mold is too low the resulting $T_E$ will be too high and cause degradation. A minimum water content of 5% by weight is required to keep $T_E$ below 190° C.

(4) the flow rate $V(g,T,P)$ is as well strongly dependent on the water content of the hydrophilic polymer. To speed up the IMP we need a high flow rate $V(g,T,P)$ which can be achieved by a higher water content.

The upper limit of the water content is defined by the stickiness and mechanical failure of the capsules; a water content of 25% (0.25) by weight cannot be generally exceeded. The range within which capsules can be molded by the method of the present invention is therefore within 0.05 to 0.25 of water content. Better capsules are made with a water content in the range between 0.10 and 0.20; the best capsules were made with the water content in the range between 0.12 and 0.18.

The hydrophilic polymer in the mold will reduce its volume due to the temperature change $T_M - T_a$. This would result in voids and diminution of size of the capsule, which therefore would be of unacceptable quality. It is an absolute requirement in capsule making that the dimensional deviations are less than 1%. To compensate for shrinking by the temperature change the mold must be filled at a distinct pressure $P_M$. This filling pressure is determined by the quantities $\alpha(T,P)$ and $\mathcal{X}(T,P)$. The injection pressure ($P_E$) depends again on $T_E$, which as was shown already is in turn strongly dependent on X.

Figure 5:
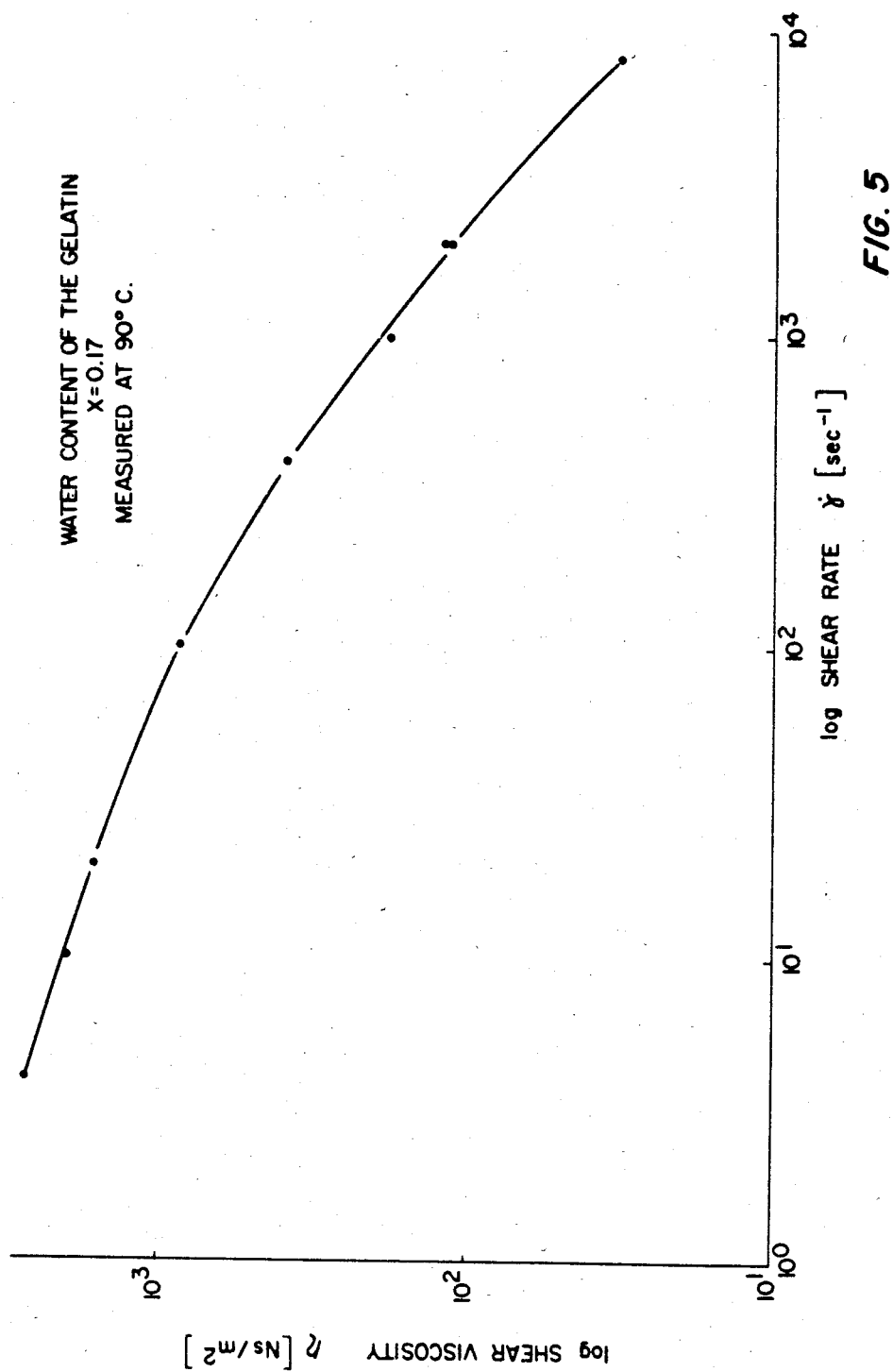
FIG. 5 is the diagram of dependence of shear viscosity of gelatin within the pertinent ranges of the shear rate in the present invention.

Referring now to FIG. 5, the shear rate dependent shear viscosity of gelatin at 90° C. is shown for gelatin with a water content X of 0.17. The capillary has a diameter of d=1.05 mm, and a length of 5.0 mm; the ratio of length to diameter is therefore L/d=4.75.

Figure 6:
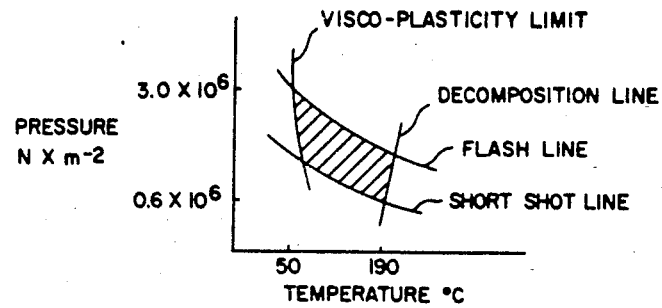
FIG. 6 is the diagram of molding area for gelatin within the ranges of time, temperature, pressure and water content of gelatin for the present invention.

Referring now to FIG. 6, the molding area diagram for gelatin with water content of 0.17. During injection molding the plasticized gelatin is discontinuously extruded and immediately cooled in a mold of the desired shape of the capsule part. Moldability depends on the gelatin properties and the process conditions, of which the thermomechanical properties of the gelatin as well as the geometry and the temperature and pressure conditions of the mold are the most important. In the molding area diagram of FIG. 6 the limits of pressure and temperature are indicated for the processing of gelatin in the combined injection molder-microprocessor of the present invention. The maximum temperature of 190° C. is determined by visible degradation of the gelatin above that limit. The lower temperature limit of 50° C. was determined by the development of too high viscosity and melt elasticity in the recommended water content range X: 0.05 to 0.25. The higher pressure limits of $3 \times 10^8$ N$\times$m$^{-2}$ are given by the start of flashing when the melted gelatin flows in a gap between the various metal dies which make up the molds, thus creating thin webs attached to the molded gelatin capsule parts at the separating lines. The lower pressure limits of about $6 \times 10^7$ N×m$^{-2}$ are determined by short shots, when the mold cannot be completely filled by the gelatin.

TABLE 3

WORKING PARAMETERS FOR INJECTION MOLDING PROCESS

| | |
|---|---|
| Density | 1,3–1.2 × 10$^3$ kg × m$^{-3}$ |
| Cristallinity | 25% |
| H(T$_E$,P$_E$)—H(T$_a$,P$_a$) | 0.32 KJoule × kg$^{-1}$ |
| Net heating performance for 10 kgs. melt/h (corresponding to 10$^6$ capsules/h) | 3.5 × 10$^5$ KJoule |
| Heat conduction number (20° C.) for gelatin | 1.0 KJoule × m$^{-1}$ × h$^{-1}$ × Degree$^-$ |
| Compressibility $\chi$(T$_E$,P$_E$) | 5 × 10$^{-10}$ N$^{-1}$ × m$^2$ |
| a(T$_a$,P$_a$) | 8 × 10$^{-5}$ (Degree C.)$^{-1}$ |
| Contraction due to crystallization | negligible |
| Critical shear deformation rate | 10$^4$–10$^5$ sec$^{-1}$ |

Figure 7:
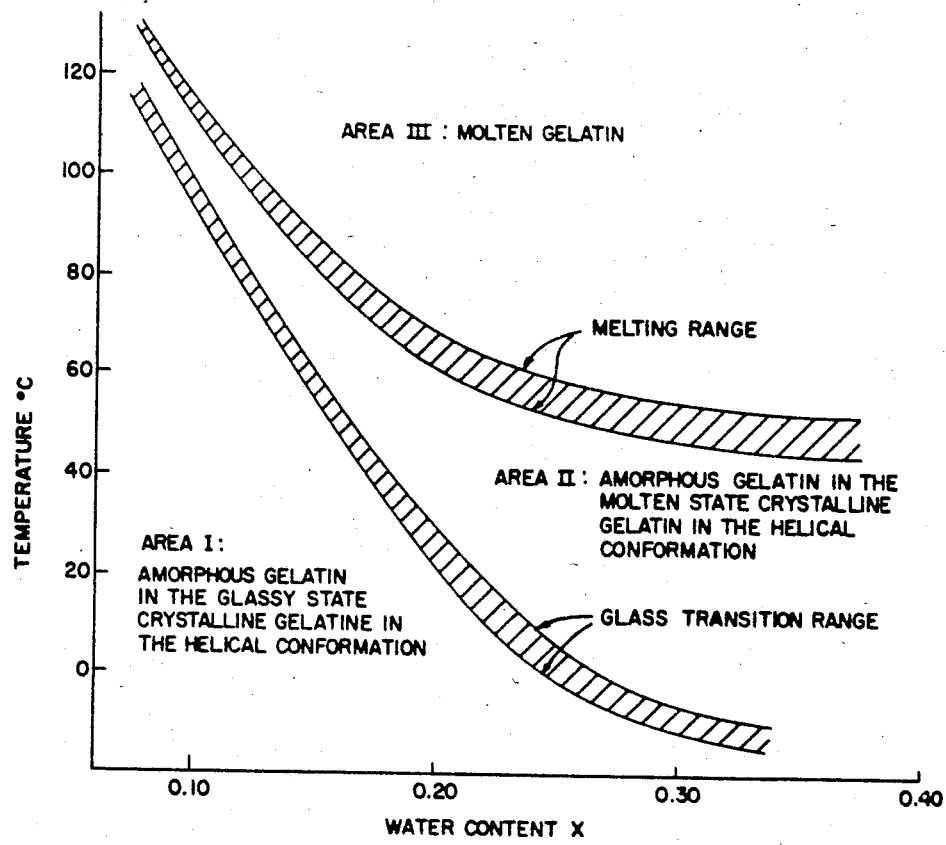
FIG. 7 is the diagram of dependence of glass transition temperature range and melting temperature range for the pertinent water content ranges of the gelatin.

The hydrophilic polymers preferably various types of gelatin are extruded and injected under the following conditions:

Referring not to FIG. 7 the glass transition range and the melting temperature range as a function of the composition of the gelatin-water system is shown. At temperatures below the glass transition range ordinary gelatin, as available commercially, is a partially crystalline hydrophilic polymer containing approximately 70% amorphous and approximately 30% crystalline parts by volume (Area I in FIG. 7). Such gelatin preparations are commonly called cold dryed gelatins. By rising the temperature of said gelatin preparation at a distinct water content the gelatin passes through the glass transition range.

Figure 8:
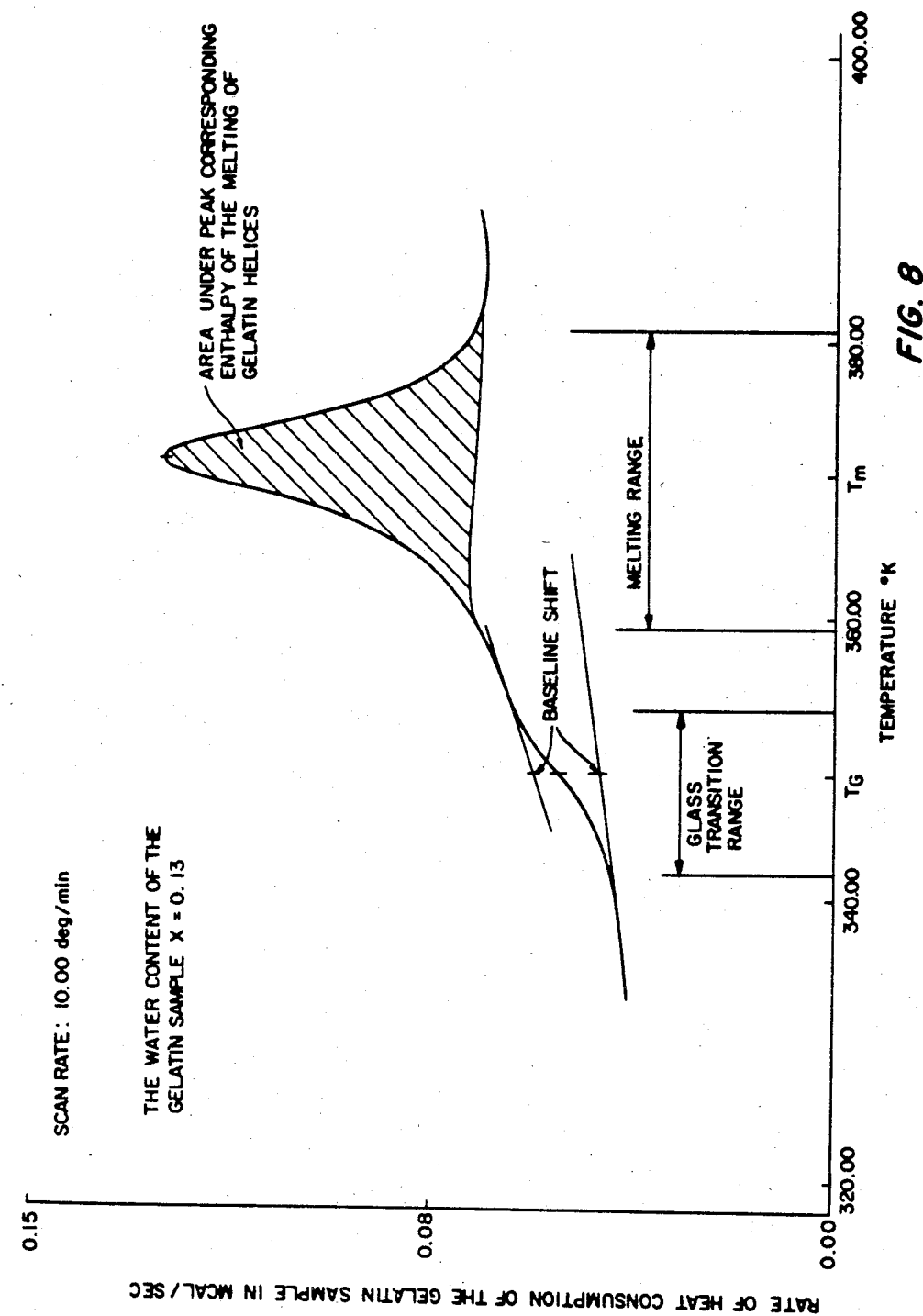
FIG. 8 is the diagram of dependence of differential calorimeter scan in which the heat consumption rate of the gelatin is plotted for the pertinent temperature range of the present invention.
Figure 9:
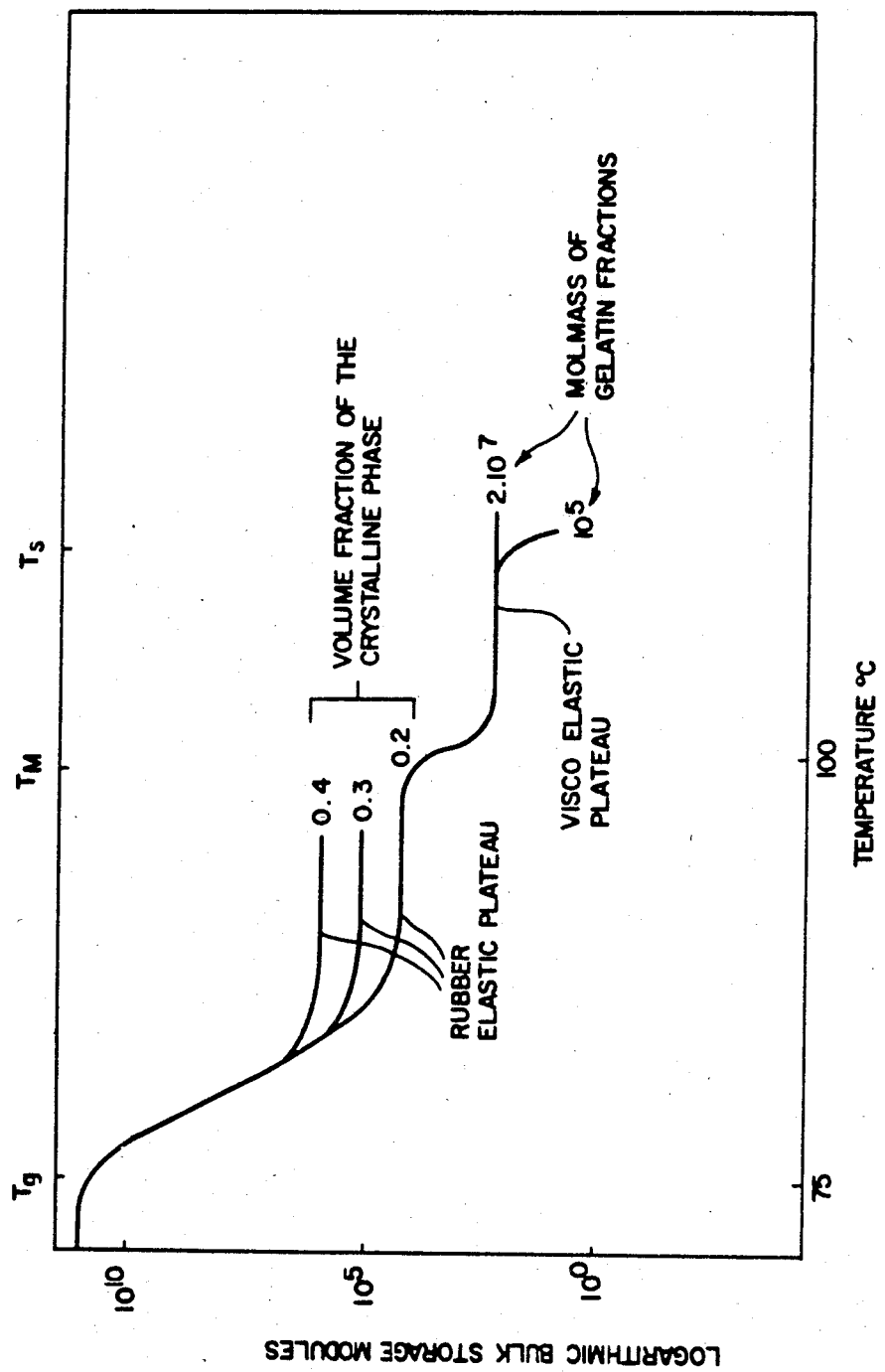
FIG. 9 is a diagram of dependence of the logarithmic bulk elastic storage module of the gelatin for the pertinent temperature range of the present invention.

Referring to FIG. 1 said heating process of the gelatin will take place within the extruder barrel 17. Referring to FIG. 2 said heating process of the gelatin will take place during the entire injection molding work cycle. The area in FIG. 7 between the glass transition range and the melting range is called area II. In area II we find crystalline gelatin and a gelatin melt. The glass-transition is not a thermodynamic transition range of any order but is characterized by a change of the molecular movement of the gelatin molecules and by a change of the bulk storage module of the amorphous gelatin by several orders of magnitude. By passing from area II to area I in FIG. 7 the translational movements of the gelatin molecules or those of large parts of said molecules will be frozen in the glass transition temperature range and this is reflected by a change in the specific heat (c$_p$) and the volumetric thermal expansion coefficient (a) in said temperature range. By passing from area II to area III due to crossing the melting range of the crystalline gelatin the helically ordered part of the gelatin will melt. Referring to FIG. 1 said heating process of the gelatin will take place within the extruder barrel 17. Referring to FIG. 2 said heating process of the gelatin will take place during the entire injection molding work cycle. Said helix-coil transition is a true thermodynamic transition of the first order and is an endothermic process. Said transitions can be detected by scanning calorimetry or by measurement of the change of the linear viscoelastic bulk storage module due to change of the temperature. A typical plot of a temperature scan with a differential calorimeter is shown in FIG. 8. On the ordinate is plotted the velocity of the heat consumed by the sample relative to a reference (empty sample holder). The velocity of heat consumption of the sample is due to the change of the temperature of the gelatin sample, and said temperature is plotted on the abscissa as degrees of kelvin. The base line shift on said plot is corresponding to the glass transition and the peak to the melting or to the helix-coil transition. The linear viscoelastic bulk storage module E can be measured at small sinusoidal shear deformations of the gelatin sample. The changes of said module of a typical gelatin sample at water content X=0.13 is plotted as a function of the sample temperature in FIG. 9. At the glass transition temperature and at the melting or helix-coil transition temperature said module changes several orders of magnitude. As is shown in FIG. 9 there exist a further transition temperature above the melting range, and said transition is characterized by a further drop in said module E. We will call the temperature of said transition the solution temperature. In the temperature range T$_g$ to T$_M$ the gelatin is in the rubber elastic state, and the crystalline ranges or fibrills represent the elastically active elements of the network.

Similar networks exist in the plasticized microcrystalline polyvinylchloride (PVC). The crystalline regions give rise to diffraction patterns of x-rays in said PVC but not in the gelatin [I. Tomka, Chimia 30, 534–540 (1976); I. Tomka et al Phot. Sci. 23, 97 (1975)]. In the temperature range: T$_M$ to T$_S$ the gelatin is in the viscoelastic rubber-elastic state. The elastically active network in said state of the gelatin is like in most polymer melts a temporary network. Said temporary network is due to entanglements of the polymer molecules. Specifically in the gelatin the strong interactions between the macromolecules (hydrogen-bridges, dipol-dipol interactions) contribute an important part to the elastically active temporary network. At the solution temperature said temporary network disrupts and the gelatin molecules specifically due to the presence of water dissolve. At a temperature higher than T$_S$ the storage module drops to extremely low values: less than 10×Nm$^{-2}$, as shown in FIG. 9. In the present invention it was found that the processing (injection molding, blow molding etc.) of the gelatin should proceed at a temperature higher than T$_S$.

Referring to FIG. 1 the heating of the gelatin to a temperature higher than T$_S$ takes place in the forward part of the extruder barrel 17. Said heating process will be maintained not only by the steam heating coils 18 but to an important proportion by the internal friction during the injection process due to the high deformational rates. Referring to FIG. 2 said dissolution process will take place especially between point A and B of the work cycle. It was found that the reversible elastic deformation of the injection molded gelatin after opening the mold 6 is negligible if the temperature of the gelatin during the injection process is higher than T$_S$, otherwise the molding sequence would drop by at least an order of magnitude.

Referring to FIG. 2 the necessary cooling period for the gelatin in the molds—to prevent any reversible elastic deformation of said gelatin—will take place between points B and E of the working cycle. A restriction of the molding sequence to low speed coupled with long keeping of the gelatin in the mold (larger than 5 sec) is undesirable because of two reasons: low output of the product and loss of water content of the gelatin in the extruder. At the elevated injection temperature there is always a transport of water from the hot to the cold gelatin in the extruder barrel. (See D. Gehrmann, Thesis, University of Darmstadt 1979). Said water transport can be compensated due to the transport of the gelatin by the screw in the opposite direction.

Figure 11:
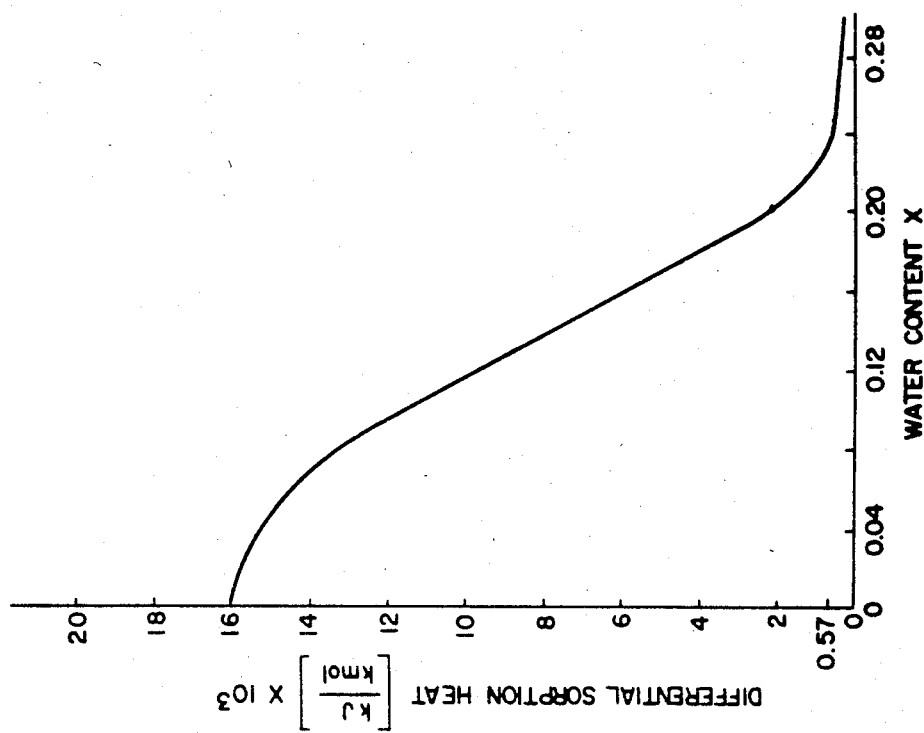
FIG. 11 is a diagram of dependence of differential heat of water adsorption in the pertinent range of water content of the gelatin of the present invention.
Figure 10:
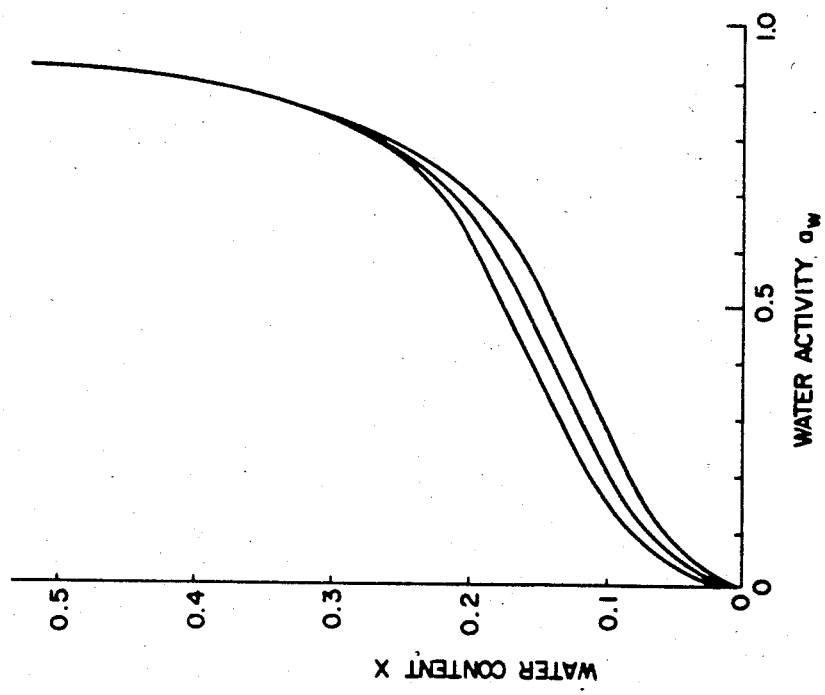
FIG. 10 is a diagram of dependence of equilibrium water content of the gelatin in the entire water activity range.

Referring to FIG. 1 said transport of gelatin will be maintained by screw 8. Referring to FIG. 2 said transport of gelatin will take place between the points A and B and further between the points C and D of the working cycle. To build up a stationary water content of the gelatin in the melting area of the extruder barrel it is necessary to work at an injection sequence which is shorter than 5 sec. To establish a constant and high enough water content of the gelatin in the extruder barrel it is further necessary to use gelatin or other hydrophilic polymers with the proper shape of both the sorption isotherm (see FIG. 10) and the differential heat of sorption as a function of the water content (see FIG. 11). The constant water content of the gelatin in the extruder barrel is necessary due to the maintenance of constant production conditions. The water content of the gelatin during the injection must fulfill the condition: X higher than 0.05 otherwise $T_S$ is also higher than 190° C. and this is undesirable due to degradation of the gelatin. The sorption isotherm of the gelatin shows an S-shape with an inflection point at about 0.5 water activity monotonously and the differential heat of sorption is a decreasing function with the water content. The condition which is necessary to avoid is a phase separation of the gelatin-water phase into the two liquid phases of gelatin-water and water. This phase separation could result in the extruder barrel during injection and is avoided by having the water activity ($a_{W,M}$) of the gelatin (at the highest temperature in the extruder barrel and for the water content range of 0.05 to 0.25 of the gelatin) less than one.

By the present invention we could drop the processing temperature of a hydrophilic polymer by at least 100° C. which means we could shift the processing temperature ($T_p$) by incorporating sufficient water (X is more than 0.05 and less than 0.25) during processing of said hydrophilic polymer leading to a range of the temperature 50° to 190° C. where no degradation of said hydrophilic polymer during the processing takes place. The melting range of a typical gelatin with water content X is less than 0.002 (which water content is common during the processing of polyamides which are in their chemical structure similar to the gelatin) is between 220° and 250° C. This melting range is again comparable with the melting range of aliphatic polyamides. Polyamides for example show a different behaviour with respect to their compatibility with water during processing. The sorption isotherm of nylon 6 for example has no inflection point, its differential heat of sorption is not a monotonuously decreasing function with the water content and already at room temperature the sorption isotherm shows an equilibrium water activity value equal to a water content for 0.05. If we now incorporate about 0.035 water content in said polyamide at ambient temperature we will find already a phase separation of water and water-polyamide phases below 100° C. Because the nylon 6 polymer is not molten at the said water content and at temperatures below 100° C. said polyamide is not processable. At a water content of 0.035 and temperatures equal to or higher than 100° C. the said polyamide is again not processable due to the syneresis of water in the extruder and the mold. This effect is well known in the corresponding literature (Kunststoff Handbuch, Volume 6: Polyamide, Editors: R. Viewegen, A. Muller, Karl Hanser Verlag, Munich, W. Germany 1966).

In the procedure of branching and crosslinking of hydrophilic polymers, preferably various types of gelatin, it is important to add the crosslinking agents, especially the covalent crosslinking agents, shortly before injection of the molten hydrophilic polymers.

Referring now to FIG. 9 of the present invention it can be concluded that an increase of the molecular weight of said hydrophilic polymers would rise the solution temperature of said polymers.

Due to possible degradation at elevated processing temperature it is not desirable to branch or crosslink said hydrophilic polymers before injection.

Referring to FIG. 1, an aqueous solution of crosslinking agents is injected in front of a mixing system being placed between the melting and plasticizing unit 4 and the injection unit 1. The crosslinking reaction mainly occurs during the injection cycle and the time after ejection of the capsule. By the above described technology on branching and crosslinking there is no disadvantage of changing the thermomechanical properties of the hydrophilic polymers during the melting and solution process.

The hydrophilic polymers preferably various types of gelatin are extruded and injected under the following conditions given in Table 3 below:

TABLE 3

| Injection Conditions for Hydrophilic Polymers | | | |
|---|---|---|---|
| Injection Unit | | | |
| Screw diameter mm | 24 | 28 | 32 |
| Injection pressure N × m$^{-2}$ | 2.2 × 10$^8$ | 1.6 × 10$^8$ | 1.2 × 10$^8$ |
| Calcuted swept volume cm$^3$ | 38 | 51.7 | 67.5 |
| Effective screw length L:D | 18.8 | 16.1 | 13.5 |
| Plasticising capacity (PS) kg/h (max.) | | | |
| Ia | 13.5 | 21.2 | 21.5 |
| IIa | 9.2 | 14.5 | 15 |
| Ib | 23.6 | 34 | 36 |
| IIb | 17.5 | 27 | 27.5 |
| Screw stroke mm (max.) | 84 | 84 | 84 |
| Injection capacity kW | 30 | 30 | 30 |
| Injection velocity mm/s (max.) | 460 4 | 60 | 460 |
| Nozzle contact force kN | 41.2 4 | 1.2 | 41.2 |
| Screw rotating speed min$^{-1}$ Var. Ia | 20 | −280 | |
| IIa | 20 | −170 | |
| Var. Ib | 20 | −600 | |
| IIb | 20 | −400 | |
| Number of heating zones | 5 | 5 | 5 |
| Installed heating capacity kW | 6.1 | 6.1 | 6.1 |
| Molding unit | | | |
| Clamping force kN | | | 600 |
| Opening stroke mm | | 100 | −250 |

In addition to the present invention for molding capsules, one skilled in the art could also use this disclosure to produce capsules utilizing profile extrusion, compression molding, vacuum forming, thermal forming, extrusion molding, polymer casting in combination with vacuum forming.

While the preferred embodiment of the injection molding-microprocessor apparatus is for the method of producing gelatin capsules from various gelatin types, it has been found that quality capsules may also be manufactured utilizing the present invention with gelatin preferably of lower quality modified just before injection by covalent and/or non-covalent crosslinking agents such as:

multivalent metal salts such as aluminum and calcium salts, boric acid, potassium alum, ammonium alum and the like;

metal salts of chromium, aluminium or zirconium (chromium acetate, chromium alum) as described in patent Nos. DT 24 39 553 A1, DT 26 26 026 A1, DT 21 48 428, and DT 25 05 746;

aldehydes and ketones as well as their halogenated derivatives as formaldehyde, paraformaldehyde, 2, 4, 6, trinitro-benzaldehyde, quinones (benzoquinone), 1,2 and 1,3 dicarbonyl compounds such as glyoxal, cyclohexandion-1,2; 1,5 dialdehydes (glutaraldehyde);

acids and acid anhydrides such as mucochloric acid, chlorides of 2-basic organic acids, anhydrides of tetracarboxylic acids;

compounds with more than 2 easy-breaking heterocyclic 3-membered rings as ethylene oxide and ethylenimine;

polyfunctional methene-sulfonic acid esters;

non nitrogen polyfunctional compounds including ethylene glycol-dimethacrylate, diepoxy butane, epichlorohydrin, dichloropropanol, diethylene glycol-dimethacrylate, dichloromethyl and dichlorooctyl ethers and the like;

nitrogen containing polyfunctional compounds as e.g. hexamethylene diisocyanate, dimethyl adipimate, bis-diazo-benzidine, Woodward's reagent K, N,N'-(1,3-phenylene)bismaleimide, N,N'-ethylene-bis-(iodoacetamide), urea, trichloro isocyanuric acid, ethylene-bismethacrylamide, tetrachloropyrimidine, dimethylol urea, dimethylol ethylene urea, methylol and dimethylol acrylamide as well as the following group of crosslinking agents described in the patent Nos. DE 23 48 294 B2, DT 24 39 553 A1, DT 25 05 746 A1, DT 26 25 026 A1, EUR 0,021,108, U.S. Pat. No. 3,321,313, and DT 21 48 428:

carbodiimides;
sulfobetain carbodiimides;
carbamoyl oxypyridinium salts;
carbamoylonium salts;
1-N-ethoxy-carboxy-2-ethoxy-dihydrochinoline;
isoxazolium salts;
bix-isoxazolium salts; and
diisocyanates.

For the manufacturing of capsules with the above described hydrophilic polymers the utilization of plasticizers, lubricants and coloring agents specifically of pharmaceutical grades leads to optimal product qualities.

Pharmacologically acceptable plasticizers, such as polyethylene glycol or preferably low-molecularweight organic plasticizers, like glycerol, sorbitol, dioctylsodium sulfosuccinate, triethyl citrate, tributyl citrate, 1,2 propylenglycol, mono-, di-, tri-acetates of glycerol etc. are utilized at various concentrations of about 0.5–40% preferably at 0.5–10% based upon the weight of the hydrophilic polymer.

Pharmacologically acceptable lubricants, such as the stearates of aluminum, calcium, magnesium and tin; as well as talc, silicones, etc. are to be used at concentrations of about 0.1–10% preferably at 0.1–5% based upon the weight of the hydrophilic polymer.

Pharmaceutically acceptable coloring agents, such as azo-dyes and other dyestuffs and pigments as iron oxides, titanium dioxides, natural dyes etc. are used at concentrations of about 0.001–10% preferably at 0.001–5% based upon the weight of the hydrophilic polymer.

In addition it has been found that the injection molding-microprocessor apparatus of the present invention can produce quality capsules with various grades of gelatin combined with extenders of 5–95% content, by weight, such as sunflower proteins, soybean proteins, cotton seed proteins, peanut proteins, rape seed proteins, lactose, gum arabic, acrylates and methacrylates, water soluble derivatives of cellulose like cellulose acetyl phthalate (CAP), hydroxypropyl cellulose, hydroxypropyl methylcellulose, hydroxypropyl methylcellulosephthalate (HPMCP), hydroxymethylcellulose, polyvinylpyrrolidone, shellac, bentonite, polyvinylacetatephthalate, phthalated gelatin, succinated gelatin, polysaccharides like agar-agar.

For the manufacturing of capsules with the above described polymers the utilization of plasticizers, lubricants and coloring agents preferably of pharmaceutical grades leads to optimal product qualities.

Pharmacologically acceptable plasticizers, such as polyethylene glycol or preferably low-molecularweight organic plasticizers, like glycerol, sorbitol, dioctylsodium sulfosuccinate, triethyl citrate, tributyl citrate, 1,2 propylenglycol, mono-, di-, tri-acetates of glycerol etc. are utilized at various concentrations of about 0.5–40% preferably at 0.5–10% based upon the weight of the hydrophilic polymer.

Pharmacologically acceptable lubricants, such as the stearates of calcium, magnesium, tin, as well as talc, silicones, etc. are to be used at concentrations of about 0.1–10% preferably at 0.1–5% based upon the weight of the hydrophilic polymer.

Pharmacologically acceptable coloring agents, such as azo-dyes and other dyestuffs and pigments as iron oxides, titanium dioxides, natural dyes etc. are used at concentrations of about 0.001–10% preferably at 0.001–5% based upon the weight of the hydrophilic polymer.

In addition it has been found that quality capsules can be made with the injection molding-microprocessor apparatus utilizing the method of the present invention with other polymers having enteric properties (2 hours resistant in gastric juice, soluble within good 30 min in intestinal juice according to USP XX) as: hydroxypropyl methylcellulosephthalate (HPMCP), polyvinylacetatephthalate (PVAP), celluloseacetylphthalate (CAP), acrylates and methacrylates (eudragit), phthalated gelatin, succinated gelatin, crotonic acid, and shellac. Said polymers having enteric properties may be combined with various extenders of 5–95% content by weight such as various grades of gelatin and/or gelatin modified by covalent and non-covalent crosslinking agents or combinations of more than one covalent and non-covalent crosslinking agents, vegetable proteins as sunflower proteins, soybean proteins, cotton seed proteins, peanut proteins, rape seed proteins, blood proteins, egg proteins, and acetylated derivatives thereof and the like, alginates, lactose, gum arabic, water soluble derivatives of cellulose hydroxypropylcellulose, hydroxypropylmethylcellulose, hydroxymethylcellulose, polyvinylpyrrolidone, and water soluble polysaccharides, like agar-agar.

For the manufacturing of capsules with the above described polymers the utilization of plasticizers, lubricants and coloring agents specifically of pharmaceutical grades leads to optimal product qualities.

Pharmacologically acceptable plasticizers, such as polyethylene glycol or preferably low-molecular weight organic plasticizers, like glycerol, sorbitol, dioctyl-sodium sulfosuccinate, triethyl citrate, tributyl citrate, 1,2 propylenglycol, mono-, di-, tri-acetates of glycerol etc. are utilized at various concentrations of about 0.5–40% preferably at 0.5–10% based upon the weight of the hydrophilic polymer.

Pharmacologically acceptable lubricants, such as the stearates of aluminum, calcium, magnesium, tin, as well as talc, silicones, etc. are used at concentrations of about 0.1–10% preferably at 0.1–5% based upon the weight of the hydrophilic polymer.

Pharmaceutically acceptable coloring agents, such as azo-dyes and other dyestuffs and pigments as iron oxides, titanium dioxides, natural dyes etc. are used at concentrations of about 0.001–10% preferably at 0.001–5% based upon the weight of the hydrophilic polymer.

In addition it has been found that quality capsules can be made with the injection molding-microprocessor apparatus utilizing the method of the present invention with other polymers as gelatin substitutes such as: vegetable proteins, as sunflower proteins, soybean proteins, cotton seed proteins, peanut proteins, rape seed proteins, blood proteins, egg proteins, and acetylated derivatives thereof and the like, alginates, lactose, gum arabic, water soluble derivatives of cellulose like hydroxyethylcellulose, hydroxypropylcellulose, hydroxypropylmethylcellulose, other water soluble carbohydrates like agar-agar, other water soluble polymers like acrylic acid polymers, polyvinylpyrrolidone and the like, vinylacetate.

For the manufacturing of capsules with the above described polymers the utilization of plasticizers, lubricants and coloring agents preferably of pharmaceutical grades leads to optimal product qualities.

Pharmacologically acceptable plasticizers, such as polyethylene glycol or preferably low-molecular weight organic plasticizers, like glycerol, sorbitol, dioctyl-sodium sulfosuccinate, triethyl citrate, tributyl citrate, 1,2 propylenglycol, mono-, di-, tri-acetates of glycerol etc. are utilized at various concentrations of about 0.5–40% preferably at 0.5–10% based upon the weight of the hydrophilic polymer.

Pharmacologically acceptable lubricants, such as the stearates of aluminum, calcium, magnesium, tin, as well as talc, silicones, etc. are to be used at concentrations of about 0.1–10% preferably at 0.1–5% based upon the weight of the hydrophilic polymer.

Pharmacetically acceptable coloring agents, such as azo-dyes and other dyestuffs and pigments as iron oxides, titanium dioxides, natural dyes etc. are used at concentrations of about 0.001–10% preferably at 0.001–5% based upon the weight of the hydrophilic polymer.

EXAMPLES

1. Series with bone gelatin No. 1 at various water contents

To test the method and apparatus as described before according to the present invention, batches of gelatin with different water contents were prepared and conditioned and then tested in an injection molding machine at different working conditions. The bone gelatin No. 1 had the following molecular mass mean values:

| Number (average): | 57000 | Dalton |
| Viscosity (average): | 155000 | Dalton |
| Weight (average): | 258000 | Dalton |
| Centrifuge (average): | 5130000 | Dalton |
| molecular mass of largest molecules: | $10^7$ | Dalton |

A batch of said gelatin in granulated form, with a mean diameter of the granules of 2 mm was conditioned as follows: The gelatin, whose original water content was 0.105 was filled into a drum and sprayed with a fine spray of water to the calculated water content as desired for each experiment. The 1% by weight of calcium stearate was added as a lubricant. The batch was then thoroughly mixed and stored in the closed drum for three days at ambient temperature. Several different series of experiment were made, each with a batch of gelatin with different water content. The temperatures at different points in the molding characteristics and quality of the capsules.

Referring to FIG. 2 the cycle times of the injection molding-microprocessor apparatus are as follows:

| Cycle Points | | Times |
|---|---|---|
| A–B | | variable, depending on temperature, see table 3 |
| B–C | (soak time) | 1 minute |
| C–D | (filling time) | 1 sec |
| D–E | | 5 sec |
| E–A | | 1 sec |

Pressure in the nozzle: $1.94 \times 10^6 N \times m^{-2}$

Temperatures at different points of screw: variable, see Tables 4–12 below

Temperature at the nozzle: variable, See Tables 4–12 below

In Table 4 below and the following tables for series A to I the abbreviations mean:

X water content of gelatin $T_M$ melting temperature of the gelatin determined by differential scanning calorimetry $T_b$ temperature at beginning of screw $T_m$ temperature at middle of screw $T_e$ temperature at end of screw $T_g$ temperature at nozzle LFV linear flow velocity L flow length D film thickness

EXAMPLE 1

Acceptable gelatin capsules containing 1% by weight of calcium stearate were prepared and processed according to the working conditions tabulated in Table 4 below:

Sample parameter: $T_M = 92.8°$ C.; $X = 0.136$

TABLE 4

| | $T_b$ | $T_m$ | $T_e$ | $T_g$ | L/D | LFV |
|---|---|---|---|---|---|---|
| A-1 | 105 | 110 | 110 | 100 | 114.3 | 72.4 |
| A-2 | 125 | 130 | 130 | 100 | 142.9 | 44.1 |
| A-3 | 135 | 150 | 150 | 100 | 171.4 | 40.0 |
| A-4 | 145 | 170 | 170 | 100 | 164.3 | 80.0 |

EXAMPLE 2

Acceptable gelatin capsules containing 1% by weight of calcium stearate were prepared and processed according to the working conditions tabulated in Table 5 below:

Sample parameters $T_M = 86.8°$ C.; X=0.146

TABLE 5

|     | $T_b$ | $T_m$ | $T_e$ | $T_g$ | $\frac{L}{D}$ | LFV |
|-----|-------|-------|-------|-------|-------|------|
| B-1 | 105 | 110 | 100 | 100 | 45.7 | 75.0 |
| B-2 | 125 | 130 | 130 | 100 | 135.7 | 28.2 |
| B-3 | 135 | 150 | 150 | 100 | 157.1 | 61.3 |
| B-4 | 145 | 170 | 170 | 100 | 92.8 | 88.9 |

EXAMPLE 3

Acceptable gelatin capsules containing 1% by weight of calcium stearate were prepared and processed according to the working conditions tabulated in Table 6 below:

Sample parameters $T_M = 85.8°$ C.; X=0.166

TABLE 6

|     | $T_b$ | $T_m$ | $T_e$ | $T_g$ | $\frac{L}{D}$ | LFV |
|-----|-------|-------|-------|-------|-------|------|
| C-1 | 105 | 110 | 110 | 100 | 92.9 | 66.7 |
| C-2 | 125 | 130 | 130 | 100 | 171.4 | 45.2 |
| C-3 | 135 | 150 | 150 | 100 | 157.1 | 24.7 |
| C-4 | 145 | 170 | 170 | 100 | 168.5 | 60.0 |

EXAMPLE 4

Acceptable gelatin capsules containing 1% by weight of calcium stearate were prepared and processed according to the working conditions tabulated in Table 7 below:

Sample parameters $T_M = 80°$ C.; X=0.174

TABLE 7

|     | $T_b$ | $T_m$ | $T_e$ | $T_g$ | $\frac{L}{D}$ | LFV |
|-----|-------|-------|-------|-------|-------|------|
| D-1 | 80 | 70 | 70 | 80 | 28.6 | 16.7 |
| D-2 | 85 | 75 | 75 | 80 | 42.9 | 18.5 |
| D-3 | 90 | 80 | 80 | 80 | 57.1 | 24.4 |
| D-4 | 95 | 85 | 85 | 100 | 64.3 | 25.0 |
| D-5 | 00 | 90 | 90 | 100 | 78.6 | 26.3 |
| D-6 | 105 | 95 | 95 | 100 | 92.9 | 30.3 |

EXAMPLE 5

Acceptable gelatin capsules containing 1% by weight of calcium stearate were prepared and processed according to the working conditions tabulated in Table 8 below:

Sample parameters Tm=75° C.; X=0.193

TABLE 8

|     | $T_b$ | $T_m$ | $T_e$ | $T_g$ | $\frac{L}{D}$ | LFV |
|-----|-------|-------|-------|-------|-------|------|
| E-1 | 75 | 90 | 95 | 100 | 85.7 | 55.6 |
| E-2 | 85 | 95 | 100 | 100 | 100.0 | 71.4 |
| E-3 | 100 | 100 | 110 | 100 | 142.9 | 41.7 |
| E-4 | 100 | 130 | 120 | 100 | 135.7 | 60.7 |
| E-5 | 130 | 150 | 130 | 100 | 157.1 | 51.9 |
| E-6 | 145 | 170 | 170 | 100 | 159.2 | 66.7 |

EXAMPLE 6

Acceptable gelatin capsules containing 1% by weight of calcium stearate were prepared and processed according to the working conditions tabulated in Table 9 below:

Sample parameters $T_M = 70°$ C.; X=0.208

TABLE 9

|     | $T_b$ | $T_m$ | $T_e$ | $T_g$ | $\frac{L}{D}$ | LFV |
|-----|-------|-------|-------|-------|-------|------|
| F-1 | 70 | 85 | 90 | 95 | 57.1 | 35.6 |
| F-2 | 75 | 90 | 95 | 100 | 52.9 | 30.8 |
| F-3 | 85 | 95 | 100 | 105 | 64.3 | 29.6 |
| F-4 | 100 | 100 | 110 | 110 | 100.0 | 25.8 |
| F-5 | 100 | 140 | 120 | 100 | 114.3 | 27.1 |

EXAMPLE 7

Bone gelatin No. 1 including the addition of a plasticizer

For apparatus and method of the present invention, a batch of gelatin with a certain content of water and a plasticizer was prepared and conditioned and then tested in an injection molding device at different working conditions. A batch of bone gelatin no. 1 in granulated form with a mean diameter of the granules was conditioned as follows. The gelatin, whose water content was 10.54% was filled into a drum and sprayed with a specially fine spray of a mixture consisting of water and glycerol as plasticizer to the calculated content as desired. The 1% by weight of calcium stearate was added as a lubricant. The following procedure exactly corresponds to the measures taken for example series 1.

Acceptable gelatin was processed according to the working conditions tabulated in Table 10 below.

Sample parameters: $T_M = 92°$ C. X=0.15;

Glycol content 3.5% by weight.

TABLE 10

|     | $T_b$ | $T_m$ | $T_e$ | $T_g$ | $\frac{L}{D}$ | LFV |
|-----|-------|-------|-------|-------|-------|------|
| G-1 | 80 | 90 | 90 | 80 | 150.0 | — |
| G-2 | 05 | 110 | 110 | 100 | 151.4 | 50.0 |
| G-3 | 125 | 130 | 130 | 100 | 171.4 | 40.0 |
| G-4 | 135 | 150 | 150 | 100 | 178.5 | 53.8 |
| G-5 | 145 | 170 | 170 | 100 | 170.0 | 57.1 |

Series with pigskin gelatin No. 2 at various water contents (Examples 8 and 9 below Pigskin gelatin No. 2 having the following molecular mass mean values was used:

| | | |
|---|---|---|
| Number (average): | 34000 | Dalton |
| Viscosity (average): | 65000 | Dalton |
| Weight (average): | 80000 | Dalton |
| Centrifuge (average): | 1450000 | Dalton |
| molecular mass of largest molecules: | $2.10^6$ | Dalton |

EXAMPLE 8

Acceptable gelatin capsules containing 1% by weight of calcium stearate were prepared and processed according to the working conditions tabulated in Table 11 below:

Sample parameters $T_M = 80°$ C.; X=0.167

TABLE 11

|     | $T_b$ | $T_m$ | $T_e$ | $T_g$ | $\frac{L}{D}$ | LFV |
|-----|-------|-------|-------|-------|-------|------|
| H-1 | 80 | 90 | 90 | 80 | 135.7 | 22.8 |
| H-2 | 105 | 110 | 110 | 100 | 164.3 | 52.9 |

EXAMPLE 9

Acceptable gelatin capsules containing 1% by weight of calcium stearate were prepared and processed according to the working conditions tabulated in Table 12 below:

Sample parameters $T_M = 70°$ C.; $X = 0.202$

TABLE 12

|  | $T_b$ | $T_m$ | $T_e$ | $T_g$ | $\frac{L}{D}$ | LFV |
|---|---|---|---|---|---|---|
| I-1 | 80 | 90 | 90 | 100 | 117.1 | 59.1 |
| I-2 | 105 | 110 | 110 | 100 | 135.7 | 90.0 |

While there have now been described and illustrated several embodiments of the present invention, the scope and working range of the present invention shall not be limited by the examples given above. The invention comprises as well various changes and modifications which will occur to those skilled in the art.

It is intended in the appended claims to cover all such changes and modifications as fall within the true spirit and scope of the present invention.

What is claimed is:

1. The method of manufacturing a shaped product from a hydrophilic polymer and water mixture having no phase separation of the water from the hydrophilic polymer-water mixture at a water content of between about 5 and 25% by weight of the hydrophilic polymer and having a certain glass transition temperature range, comprising the steps of:
   (a) mixing the polymer with water in a predetermined amount between about 5 and 25% by weight of the hydrophilic polymer;
   (b) heating the hydrophilic polymer with said water while maintaining said predetermined water content to form a melt;
   (c) further heating the hydrophilic polymer melt and water to a temperature to dissolve the melt in the water and achieve a homogeneous dispersion on a molecular level while maintaining said predetermined water content;
   (d) injecting the dissolved hydrophilic polymer melt into a mold cavity while maintaining said predetermined water content;
   (e) cooling the hydrophilic polymer melt in said mold to form a molded product at a temperature below the glass transition temperature range of the hydrophilic polymer while maintaining said predetermined water content; and
   (f) ejecting the molded product of said hydrophilic polymer from said mold.

2. The method of manufacturing a shaped product from a hydrophilic polymer and water mixture having no phase separation of the water from the hydrophilic polymer-water mixture at a water content of between about 5 and 25% by weight of the hydrophilic polymer and having a certain glass transition temperature range, comprising the steps of:
   (a) heating the hydrophilic polymer with water of a predetermined amount between about 5 and 25% by weight of the hydrophilic polymer to form a melt;
   (b) maintaining said predetermined water content during said heating;
   (c) further heating the hydrophilic polymer melt and water to a temperature to dissolve the melt in the water and achieve a homogeneous dispersion on a molecular level while maintaining said predetermined water content;
   (d) injecting the dissolved hydrophilic polymer melt into a mold cavity while maintaining said predetermined water content;
   (c) cooling the hydrophilic polymer melt in said mold to form a molded product at a temperature below the glass transition temperature range of the hydrophilic polymer while maintaining said predetermined water content; and
   (f) ejecting the molded product of said hydrophilic polymer from said mold.

3. The method according to claim 2 wherein:
   (a) the hydrophilic polymer melt is cooled in said mold to ambient temperature; and
   (b) the predetermined water content is maintained at a value which is correlated with the temperature of the hydrophilic polymer melt whereby the glass transition temperature range of said hydrophilic polymer is above ambient temperature when the hydrophilic polymer melt contains said value of water content.

4. The method according to claim 3 wherein:
   (a) the predetermined water content is maintained at the temperature to which the hydrophilic polymer is heated by subjecting the hydrophilic polymer melt and water to sufficient pressure to prevent evaporation of said water.

5. The method according to any one of claims 1-4 wherein:
   (a) the predetermined water content is maintained at a value between 10 and 20% by weight of the hydrophilic polymer;
   (b) the temperature of the hydrophilic polymer melt and water is raised to a value of between about 50° and 190° C. during the heating thereof;
   (c) the hydrophilic polymer melt and water is subjected during heating to a pressure of between about $600 \times 10^5$ and $3000 \times 10^5$ newtons per square meter; and
   (d) the hydrophilic polymer melt is cooled in said mold to an ambient temperature of about 20° C.

6. The method according to claim 5 wherein:
   (a) the water content is maintained at a value between 12 and 18% by weight of the hydrophilic polymer; and
   (b) the temperature of the hydrophilic polymer melt and water is raised to a value of between about 70° and 170° C. during the heating thereof.

7. The method of manufacturing a shaped product from a gelatin and water mixture having no phase separation of the water from the gelatin-water mixture at a water content of between about 5 and 25% by weight of the gelatin and having a certain glass transition temperature range comprising the steps of:
   (a) feeding the gelatin with a predetermined amount of water of between about 5 and 25% by weight of the gelatin into the input end of an extruder;
   (b) heating the gelatin while maintaining said predetermined water content to form a melt;
   (c) further heating the gelatin melt and water as it moves toward the exit end of the extruder to a temperature above the glass transition temperature range of the gelatin to dissolve the gelatin melt in the water and achieve a homogeneous dispersion on a molecular level while maintaining said predetermined water content;

(d) injecting the dissolved gelatin melt directly into the cavity of an injection mold while maintaining said predetermined water content;

(e) cooling the gelatin melt in said mold to form a molded product at a temperature below the glass transition temperature range of the gelatin while maintaining said predetermined water content; and (f) ejecting the molded product of said gelatin from said mold.

8. The method according to claim 7 wherein:

(a) the gelatin melt is cooled in said mold to ambient temperature; and (b) the predetermined water content is maintained at a value which is correlated with the temperature of the gelatin melt whereby the glass transition temperature range of said gelatin-water mixture is above ambient temperature when the gelatin melt contains said value of water content.

9. The method according to claim 8 wherein:

(a) the gelatin melt is cooled in said mold to an ambient temperature of about 20° C.; and (b) the predetermined water content is maintained at a value between 12 and 18% by weight of the gelatin.

10. The method according to any one of claims 7-9 wherein:

(a) the predetermined water content is maintained at the temperature to which the gelatin melt is heated by subjecting the gelatin and water to sufficient pressure to prevent evaporation of said water.

11. The method according to claim 10 wherein:

(a) the temperature of the gelatin melt and water is raised to a temperature of between about 50° and 190° C. during the heating thereof.

12. The method according to claim 11 wherein:

(a) the gelatin melt and water is maintained at a pressure of between about $600 \times 10^5$ and $3000 \times 10^5$ newtons per square meter.

13. The method according to claim 6 including the step of:

(a) forming the shaped product into the shape of a capsule part in the injection mold cavity.

14. The method according to claim 9 further comprising the step of:

(a) mixing one or more plasticizers with the gelatin-water mixture, said plasticizers being selected from polyethylene glycol and low-molecular-weight organic plasticizers including glycerol, sorbitol, dioctylsodium sulfosuccinate, triethyl citrate, tributyl citrate, 1,2 propyleneglycol and mono-, di- and tri-acetates of glycerol, in an amount in the range from 0.5 to 10% based upon the weight of the hydrophilic polymer.

15. The method according to claim 12 including the step of:

(a) forming the shaped product into the shape of a capsule part in the injection mold cavity.

16. The method of manufacturing a shaped product from a hydrophilic polymer and water mixture having no phase separation of the water from the hydrophilic polymer-water mixture at a water content of between about 5 and 25% by weight of the hydrophilic polymer and having a certain glass transition temperature range, comprising the steps of:

(a) mixing the polymer with water in a predetermined amount between about 5 and 25% by weight of the hydrophilic polymer;

(b) heating the hydrophilic polymer in said water while maintaining the water content between said 5 and 25% to form a melt;

(c) further heating the hydrophilic polymer melt and water to a temperature to dissolve the melt in the water and achieve a homogeneous dispersion on a molecular level while maintaining the water content between said 5 and 25%;

(d) injecting the dissolved hydrophilic polymer melt into a mold cavity while maintaining the water content between said 5 and 25%;

(e) cooling the hydrophilic polymer melt in said mold to form a molded product at a temperature below the glass transition temperature range of the hydrophilic polymer while maintaining the water content between said 5 and 25%; and (f) ejecting the molded product of said hydrophilic polymer from said mold.

* * * * *